(No Model.) 3 Sheets—Sheet 1.
F. A. FOUTS.
SPINNING TOP.
No. 267,866. Patented Nov. 21, 1882.
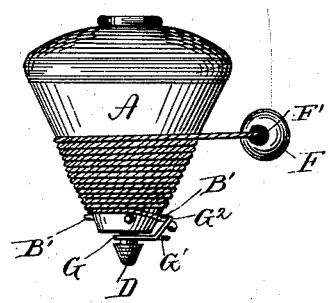
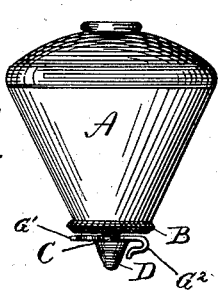
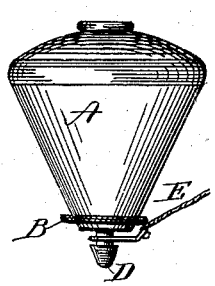
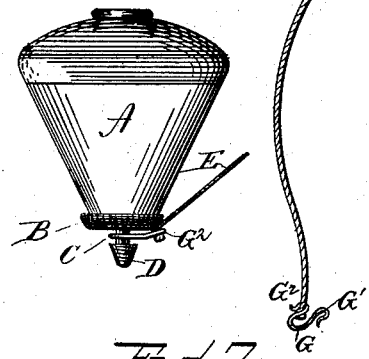
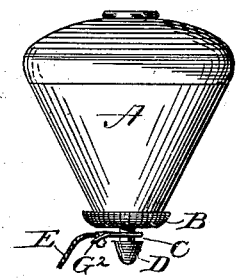
Witnesses.
F. L. Ouraud
R. D. Smith
Inventor.
Frank A. Fouts
N. PETERS. Photo-Lithographer. Washington, D. C.

(No Model.)
F. A. FOUTS.
SPINNING TOP.
No. 267,866. Patented Nov. 21, 1882.
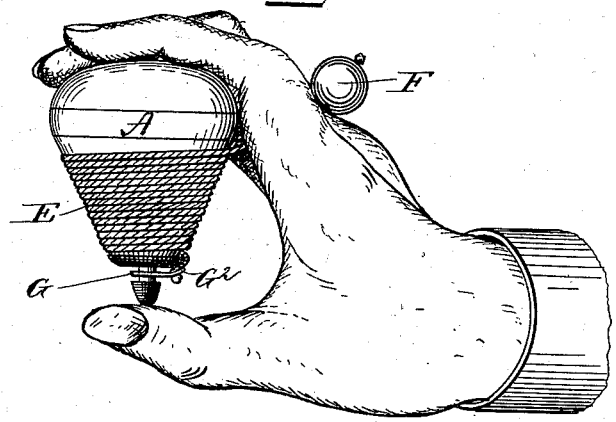
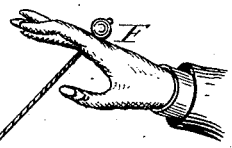
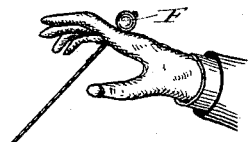
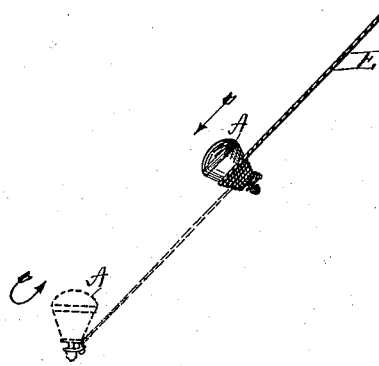
WITNESSES
INVENTOR
Frank A. Fouts

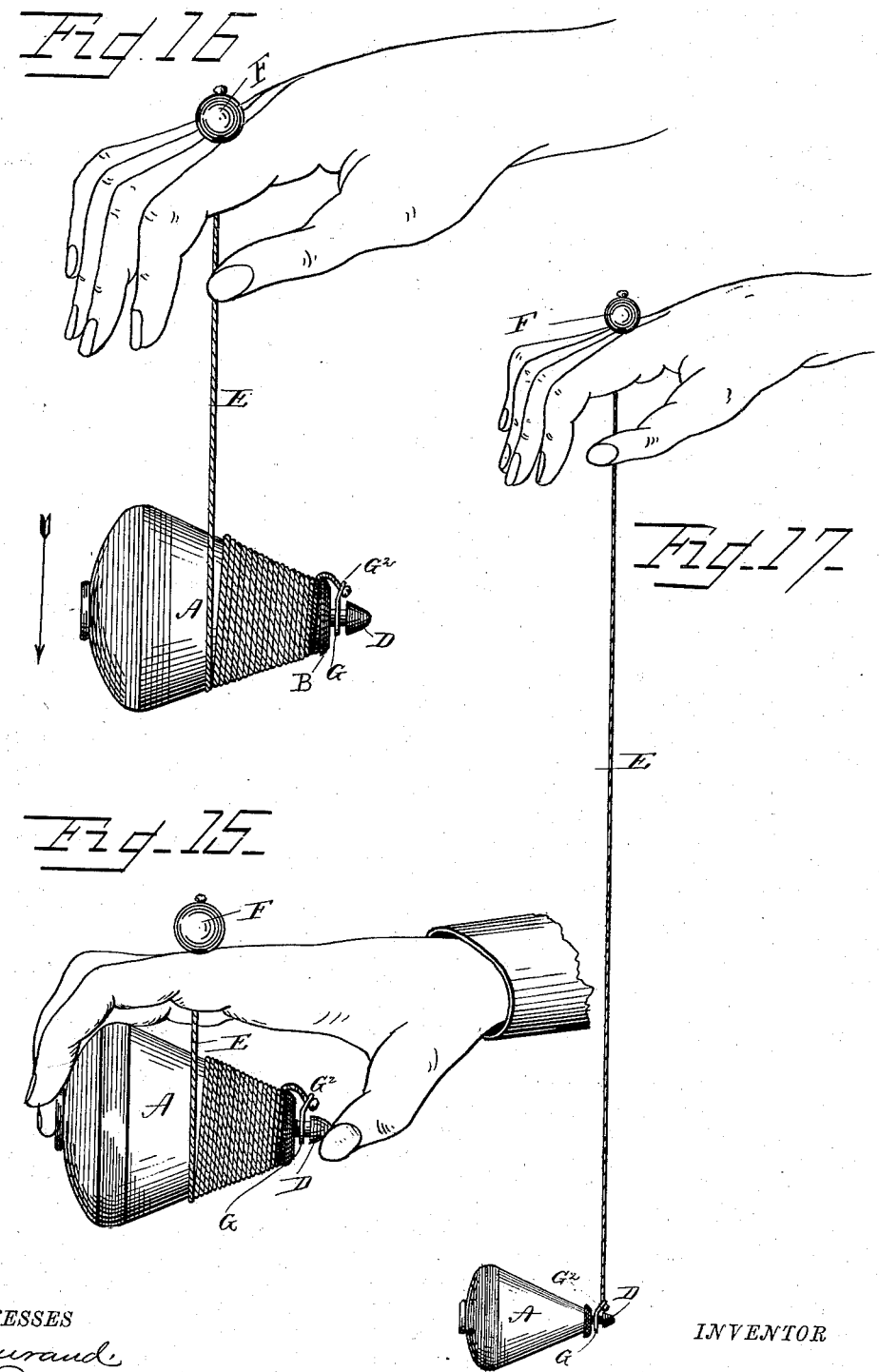

UNITED STATES PATENT OFFICE.

FRANK A. FOUTS, OF WASHINGTON, DISTRICT OF COLUMBIA.

SPINNING-TOP.

SPECIFICATION forming part of Letters Patent No. 267,866, dated November 21, 1882.

Application filed October 20, 1882. (No model.)

To all whom it may concern:

Be it known that I, FRANK A. FOUTS, a citizen of the United States, residing at Washington, in the District of Columbia, have invented certain new and useful Improvements in Children's Spinning-Tops, of which the following is a specification, reference being had therein to the accompanying drawings.

My invention relates to children's spinning-tops.

It consists in certain improvements on my application for Letters Patent, filed in the United States Patent Office, September 16, 1882.

The improvements shown herewith consist in providing the small end of a cone-shaped top with a milled or rough-edged flange or other cord arresting or engaging or frictional means; also, in a hook attachable and detachable from the cord at pleasure, said hook being provided with one or more eyes or arms bent upward from the plane of its base, all of which will be more fully hereinafter described, and pointed out in the claims.

In my former application of September 16, 1882, I set forth that my invention consisted, "first, in providing a top with a circumferential groove at its lower end and a laterally-extending circumferential flange; and, second, in a cord provided with a hook adapted to attach said cord to the top by engagement with said groove, and a recessed button within which said hook may be concealed when not in use."

I also set forth in said former application that my invention has for its objects, "first, a top which is adapted to be spun in the ordinary manner—i. e., the winding a cord on its body and throwing the top from the end of the cord to the floor, whereby it is caused to spin on the point of the peg; second, a top which may be spun gyroscopically, suspended in a hook on the end of the spinning-cord, the hook connecting the cord and top, said hook being attachable to and detachable from the top at pleasure; third, a top which may be spun by a cord provided with a hook, the hook being engaged in a circumferential groove in the bottom of the top during the operation, whereby one can trail the top about the floor while it is spinning; fourth, a cord provided at one end with a resilient hook and at the other with a recessed button, the button being adapted to slide on the cord and secrete the hook, whereby the same cord may be quickly changed, so as to be used in the usual way, or present the hook when it is desired to connect the cord and top; fifth, a top adapted to be thrown outwardly to the end of the cord, and returned to the hand of the operator by a single throw, the cord being first unwound and then rewound on the body of the top, the loose end of the cord remaining in the hand during the operation."

The top set forth and claimed in my former application hereinbefore referred to is similar in all respects to the top herein shown in Figure 1, with the exception of the flange. In said former application the periphery of the circumferential flange was smooth. In my improvement herein shown and specified the periphery of the flange is rough. The object and advantage of roughing or milling the periphery of the flange is to effect a more rapid and certain return of the top to the hand of the operator when thrown outward or downward, the hook secured in the groove, the cord wound upon the body of the top, and the loose end of the cord secured in the hand by button. When thus connected and thrown (the top not being permitted to strike the floor) said top passes outward on the cord to the end thereof, at which point it revolves rapidly in the hook for an instant and quickly rises gyroscopically, throwing its flange and body in frictional contact with the cord just above the hook, which causes said top to re-engage the cord and ascend to the hand of the operator, whereby it may be caught like a return-ball. In rising gyroscopically, as stated, at the end of the cord the flange and cord are thrown in contact. The friction between the rapidly-revolving flange and the distended cord effects the engagement of the cord on the body of the top. The cord thus being given a winding start on the small end of the top, the rapid revolutions of said top cause it to ascend the cord to the hand from which it is thrown. The top unwinds itself from the cord in its outward passage, and the cord is rewound thereon in the ascent. In order, therefore, to effect a certain and quick return of the top, I rough or mill the periphery of the flange to increase the friction between the cord and flange when the top rises to ascend the cord. I have demonstrated experimentally that by roughing the edge of the flange the return is more easily effected, and it is produced by a less forcible throw. The studs (shown in Fig. 2 of the drawings) also produce a quick return. They engage the cord the instant the top rises after being thrown outward, and cause it to ascend the cord in the manner and for the purpose hereinbefore adverted to.

In the accompanying drawings, Fig 1. represents a side elevation of a top provided on its peg end with a circumferential flange having a milled or rough edge. One form of hook is secured in its circumferential groove. When the spinning-cord is engaged in the turned-down loop of the hook the top may be spun gyroscopically, suspended from the end of the cord. Fig. 2 is a side elevation of a top provided on its small end with a series of outwardly-projecting pins or studs. In this view a cord is shown wrapped upon the body of the top above the studs, the hook on the lower end of the cord being engaged in the groove. Fig. 3 is a side elevation of a top provided with a groove and a milled flange, said flange being higher on the body of the top than the flange shown in Fig. 1. When the hook is secured in the groove of the top, Fig. 3, and the raised eye or arm placed upward, the bottom end of the cord is elevated, so as to produce frictional contact with the milled flange and effect the return; but when the hook is secured in the groove with the bent eye turned downward the cord is held away from the flange and adapted to spin the top gyroscopically at right angles from the cord. Fig. 4 is a side elevation of a top provided with a rose-shaped radial-grooved flange, the hook being engaged in the circumferential groove with the angled eye turned upward, thereby placing the connected cord in contact with the rough periphery of the flange, whereby the parts are adapted to effect the return of the top to the hand when thrown. Fig. 5 is a similar view of a like top, the angled eye of the hook being turned downward, thereby preventing frictional contact between the cord and flange when the top is gently dropped from the hand for the gyroscopic effect. Frictional contact between the cord and rough flange would frustrate the gyroscopic effect. Fig. 6 is a side elevation and plan, respectively, of a top and indented flange, the top being equipped with an indented flange on its small end, adapted to engage the cord and effect the return when the cord and top are connected by the hook, with the angled eye of the hook turned upward. Fig. 7 represents a plan and side view, respectively, of a hook, one eye of said hook being bent outward from the plane of the base, and provided with a fragment of the cord. The cord is placed in the short arm for the return effect and in the long one for the gyroscopic feature. Fig. 8 is a spinning-cord provided on one end with a recessed sliding button and on the other with a double-eyed hook, the hook being removable from the cord at pleasure, and changeable thereon from one eye to the other, one of said eyes being bent upward from the plane of the base. Fig. 9 also represents the spinning-cord. In this view the button is slid to the hook end and the hook secured in the recess of the button, whereby the cord is adapted to spin the top in the old-fashioned manner. Fig. 10 is a plan and side view, respectively, of the double-eyed hook, one of the eyes or arms being bent upward from the plane of the base. Fig. 11 is a side and plan view, respectively, of a milled-flanged top and ringed hook, the ring being permanently secured in the groove of the top, while the hook, formed integral with the said ring, projects outward and is adapted to fit the lower end of the cord, the cord, however, being removable from the hook at pleasure. Fig. 12 is a side elevation of a hand holding the top, the hook on the lower end of the cord engaging the circumferential groove, the cord being wound on the body of the top, and the loose end secured between the fingers by means of the button. When the parts are thus arranged and secured one may throw the top downward perpendicularly, or outward at about an angle of forty-five degrees, (not permitting the top in either case to strike the floor,) which action will cause the top to pass to the end of the cord and return thereon to the hand of the operator. Fig. 13 represents the top in the act of passing outward on the cord in the direction of the straight arrow. The continuation (in dotted lines) shows the top at the outer end of the cord, rising gyroscopically, and throwing its flange in frictional contact with the cord, whereby the cord is given a winding start on the body of the top, and the return to the hand effected. Fig. 14 represents the top, after the throw, returning to the hand and winding the cord on its body in the ascent. Fig 15 represents a hand holding the top, the hook being secured in the groove, the eye turned downward, holding the cord away from the under side of the flange, the cord wound upon the body of the top, and the loose end of the cord secured between the fingers by the button. When the parts are thus united and the top dropped gently from the hand it will pass to the end of the cord, as shown in Figs. 16 and 17, and spin in the hook on the end of the cord, as represented by the latter figure.

Similar letters refer to similar parts throughout the several views.

The letter A represents the body of the top, and B a milled or rough-edged flange thereon.

B' are pins or studs fixed in the sides of the top, above the circumferential groove C, and D is the point or peg.

E is the cord, having knotted ends.

F is a sliding button, having an opening or recess, F'.

G represents the body of the hook, provided with an arm or eye, G', on a line therewith, and $G^2$ is the arm or eye bent upward from the plane of the body of the hook, and G³, Fig. 11, is a ring provided with a hook, G'. The hook and eyes are formed integral of resilient iron. By means of the eyes the hook is removable from the cord at pleasure. By engaging the cord in the bent-up eye G² and securing the hook in the circumferential groove in the top, with said eye extended upward, the end of the cord secured therein is placed and held in frictional contact with the flange when the top reaches the end of the cord, after having been thrown from the hand, whereby the return feature is effected; but when the hook is secured in the groove in a reverse manner the eye G² is turned downward and the top adapted to be spun, gyroscopically, suspended in said hook on the end of the cord by first winding the cord on the body of the top, then securing the loose end of the cord between the fingers by the button, and letting the top fall gently from the hand. When it is desired to spin the top in the old-fashioned peg manner the hook should be disengaged from the groove and the button slid to the hook end and the hook secreted in the recess of the button; or the hook may be removed from the cord. In either case the cord presents an ordinary spinning-cord—i. e., a button on one end and a knot on the other.

Having thus described my invention, what I claim as new, and desire to secure by Letters Patent, is—

1. A spinning-top having a body adapted to receive a cord by which it is spun, said top being provided with a milled or rough-edged flange, substantially as described, and for the purposes set forth.

2. A spinning-top having a body adapted to receive a cord by which it is spun, said top being provided with a circumferential groove and a milled or rough-edged flange, substantially as herein specified.

3. A spinning-top having a body adapted to receive a cord by which it is spun, said top being provided with a circumferential groove and a milled or rough-edged circumferential flange, in combination with a spinning-cord, substantially as described, and for the purposes set forth.

4. A spinning-top having a body adapted to receive a cord by which it is spun, said top being provided with a circumferential groove, in combination with a spinning-cord provided on one end with a hook and eye, said eye being bent upward from the plane of the base of the hook, substantially as described, and for the purposes set forth.

5. A spinning-top having a body adapted to receive a cord by which it is spun, said top being provided on its peg end with a circumferential groove and a circumferential milled or rough-edged flange, in combination with a spinning-cord provided on one end with a hook reversible and detachable from said cord at pleasure, substantially as specified.

6. A spinning-top having a body adapted to receive a cord by which it is spun, said top being provided with a circumferential groove and a circumferential milled or rough-edged flange, in combination with a spinning-cord provided with means for attaching said cord in the circumferential groove of the top, said means being detachable from or reversible on the cord at pleasure.

7. A spinning-top having a body adapted to receive a cord by which it is spun, said top being provided with a circumferential groove and a circumferential milled or rough-edged flange, in combination with a spinning-cord provided with means whereby it can be attached in or detached from said groove, the cord being provided with a sliding recessed button adapted to secrete the connecting means, as set forth and specified.

8. A spinning-top having a body adapted to receive a cord by which it is spun, said top being provided with a circumferential groove and a rough-edged flange on the peg end or other frictional or cord-engaging means on said end, in combination with a spinning-cord provided with a reversible and detachable hook, whereby the cord and top may be connected and the top thrown outward and returned to the hand of the operator by a single throw, as specified.

9. A spinning-top having a body adapted to receive a cord by which it is spun and a cord to spin the same, said top being provided with a rough-edged flange on its peg-end or other frictional or cord-engaging means on said end, substantially as set forth.

10. A spinning-top having a body adapted to receive a cord by which it is spun, said top being provided with a rough-edged circumferential flange or other frictional or cord-engaging means, in combination with a spinning-cord provided with means of attachment to the top, whereby the top may be spun outward on the cord and returned to the hand of the operator by a single throw or spun gyroscopically, suspended in the connecting means on the end of the cord, as specified.

11. A spinning-top having a body adapted to receive a cord by which it is spun, said top being provided with a circumferential groove and a rough-edged flange or other frictional or cord-arresting means on the small end of said top, in combination with a spinning-cord provided with means whereby it can be engaged in said circumferential groove, said cord being provided with a sliding recessed button, substantially as described, and for the purposes set forth.

12. A spinning-top having a body adapted to receive a cord by which it is spun, said top being provided with a circumferential groove and a rough-edged flange or other frictional or cord-arresting means on the small end thereof, in combination with a spinning-cord provided with means adapted to engage or disengage said cord and top, said engaging means being adapted to hold the end of the cord against or away from the rough-edged flange or other frictional or cord-arresting means, whereby the top may be thrown outward on the cord and returned to the hand of the operator by a single throw or suspended in the connecting means on the cord and spun gyroscopically, substantially as described, and for the purposes set forth.

13. A spinning-cord provided with a hook having one or more eyes adapted to engage the cord or be removed therefrom at pleasure, in combination with a spinning-top, substantially as set forth.

14. A spinning-top having a circumferential groove and a rough-edged flange on the small end, in combination with a spinning-cord provided with means adapted to engage the circumferential groove of the top, said means having a bent arm or eye adapted to hold the cord against the rough-edged flange or other cord-arresting means or hold the cord away from the said flange or cord-arresting means, whereby the top may be spun gyroscopically, suspended from the cord or spun outward on the cord and returned to the operator by a single throw, as specified.

In testimony whereof I affix my signature in presence of two witnesses.

FRANK A. FOUTS.

Witnesses:
FRANK E. WHITE,
R. D. O. SMITH.